United States Patent
Uhlin

[11] Patent Number: 5,813,253
[45] Date of Patent: Sep. 29, 1998

[54] ARRANGEMENT FOR BALANCING OF A BODY ROTATABLE ABOUT AN AXIS

[75] Inventor: Stig Göran Uhlin, Lagan, Sweden

[73] Assignee: Aktiebolaget Electrolux, Stockholm, Sweden

[21] Appl. No.: 776,326
[22] PCT Filed: Jul. 21, 1995
[86] PCT No.: PCT/SE95/00881
  § 371 Date: Jan. 24, 1997
  § 102(e) Date: Jan. 24, 1997
[87] PCT Pub. No.: WO96/03541
  PCT Pub. Date: Feb. 8, 1996

[30] Foreign Application Priority Data
Jul. 26, 1994 [SE] Sweden ................................. 9402577

[51] Int. Cl.⁶ .................................................... D06F 37/22
[52] U.S. Cl. .......................... 68/23.2; 210/144; 74/573 R
[58] Field of Search .................................. 68/23.2, 23.3, 68/140; 210/144; 74/573 R

[56] References Cited

U.S. PATENT DOCUMENTS 1,967,163  7/1934  Thearle ................................. 74/573 R
3,410,154 11/1968  Deakin ................................. 74/573 R
4,075,909  2/1978  Deakin ................................. 74/573 R
4,117,742 10/1978  Stein ................................... 74/573 R

FOREIGN PATENT DOCUMENTS 2113655  9/1972  Germany ............................... 68/23.2

Primary Examiner—Frankie L. Stinson
Attorney, Agent, or Firm—Pearne, Gordon, McCoy and Granger LLP

[57] ABSTRACT

In an arrangement for balancing of a main mass (14) having an imbalance and rotating about an axis (18) balancing masses (23; 24) are used which are relatively freely movable with respect to the main mass (14) and disposed in at least one closed path (22) symmetrically positioned around said axis (18). The main mass (14) is adapted to be rotated at speeds both below and above the critical speed and the path (22) is connected with the main mass (14) so as to rotate in synchronism therewith. Locking means (34, 36; 42, 43) are provided for locking the balancing masses (23/ 24) relative to the path (22) at rotating speeds below the critical speed and for releasing the balancing masses (23; 24) for movement relative to the path (22) at rotating speeds above the critical speed.

11 Claims, 6 Drawing Sheets

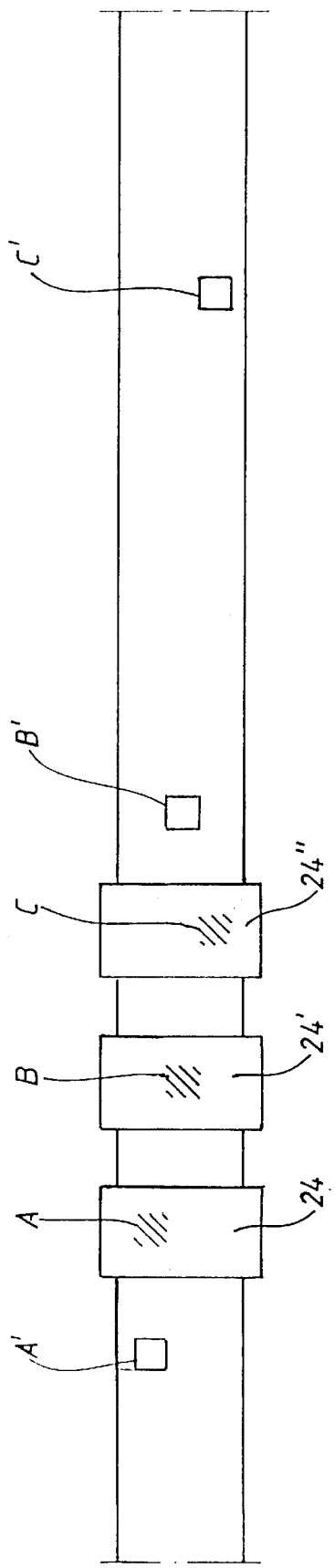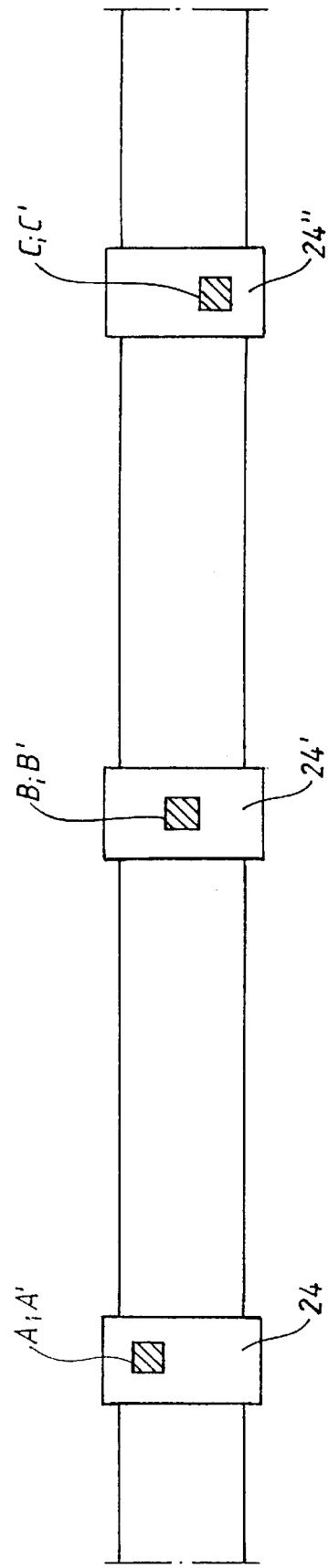
Fig. 6

ARRANGEMENT FOR BALANCING OF A BODY ROTATABLE ABOUT AN AXIS

BACKGROUND OF THE INVENTION

The present invention refers to an arrangement for balancing of a main mass having an imbalance and rotating about an axis, said balancing being made by means of balancing masses which are relatively freely moveable with respect to the main mass and disposed in at least one closed path symmetrically positioned around the axis, the main mass being adapted to be rotated at speeds both below and above the critical speed and the path being connected with the main mass so as to rotate in synchronism therewith.

In the publications GB-A-1598399 and FR-A-1213067 washing machines are described comprising a washing drum which is rotatable about a horizontal axis. In order to balance the drum when it is accelerated up to a centrifugal speed the drum has been provided at its rear and front end, respectively, with annular closed paths which follow the periphery of the drum, each path containing a plurality of ball-shaped bodies which can move freely in the respective path. In order to dampen the sound from the balls moving in the ball paths and, at the same time, to make the behaviour of the balls become calmer as well as to counteract the tendency of ball self-oscillation the ball paths are filled with oil. In order to prevent, as far as possible, that the balls are activated at washing speed, but, at the same time, achieve that the balls can rapidly change position at speeds above the critical speed the viscosity of the oil has to be properly chosen.

In the washing machines described it can happen that when the washing drum is accelerated to centrifugal speed and when during the following centrifugation phase the drum is driven at that speed the balls in the respective path hit one another causing oscillations of the washing drum in a direction perpendicular to the direction of the axis of rotation. The course can be described as chaotic and instead of a smooth vibrationless movement of the balanced drum additional movement patterns are obtained which complicate the balancing procedure.

Another problem in the washing machines described is that when the drum rotates below the critical speed the balls acting as balancing masses can cooperate with the imbalance in the drum due to the unevenly distributed laundry therein causing very large oscillation amplitudes of the oscillating system to be developed. This leads to great difficulties when the drum is to be accelerated to a centrifugal speed above the critical speed, passing the latter at which the amplitude of the oscillation is at the greatest. The balls which are freely moveable in the closed paths work very well for the purpose of compensating the imbalance in the drum due to the laundry at speeds above the critical speed. However, if allowed to move freely at speeds below the critical speed the balls can cause the disadvantages referred to above.

Another problem is that the relative movement between the balancing weights and the main mass (between the balls and the washing drum including the laundry) can be very large if no measure is taken. This happens when the main mass (the washing drum) and the balancing weights (the balls) are not rotating in synchronism which occurs primarily when the main mass is retarded to standstill while the balancing weights, which cannot be influenced from the outside, continue rotating until the kinetic energy thereof has decayed.

SUMMARY OF THE INVENTION

An object of the invention is to remedy the drawbacks present in the prior art and to provide a balancing arrangement in which the balancing masses are prevented from moving with respect to the main mass when the main mass is rotated at a speed below the critical speed whereas at speeds above the critical speed the balancing masses can be freely positioned in the paths so as to compensate the instantaneous imbalance of the main mass.

DESCRIPTION OF THE DRAWINGS

These and further features of the present invention will be apparent with reference to the accompanying description and drawings, wherein:

FIG. 6 shows schematically the path in spread out shape with three balancing bodies in the form of carriages provided with locking devices which are mutually laterally displaced.

DETAILED DESCRIPTION OF THE PREFERRED EMBODIMENTS

The balancing arrangement of the invention can be applied in a number of different connections wherein a rotating body presents an imbalance which is major or minor and needs to be compensated. As an example wheels for a vehicle can be mentioned which are provided with tires which during the lifetime gradually get worn so that the imbalance conditions change and from time to time the wheels have to be rebalanced. Another example is the washing machine in which the imbalance conditions vary considerably during a treatment cycle with a given laundry load as well as between different treatment cycles with different amounts and types of laundry. The problem is also present in centrifuges of the rapid rotating type for medical use and for use in laboratories. The invention can be used also in various turbine applications.

As in the first place the invention has been made for the purpose of being applied in a washing machine or in a spin dryer the more detailed description will be given in connection with such application. An embodiment primarily intended for a vehicle wheel or the like will also be described. In the latter case it is of interest that the balancing set be kept instead of being replaced by a reference setting prior to every new treatment cycle as is the case in the washing machine application.

Figure 1:
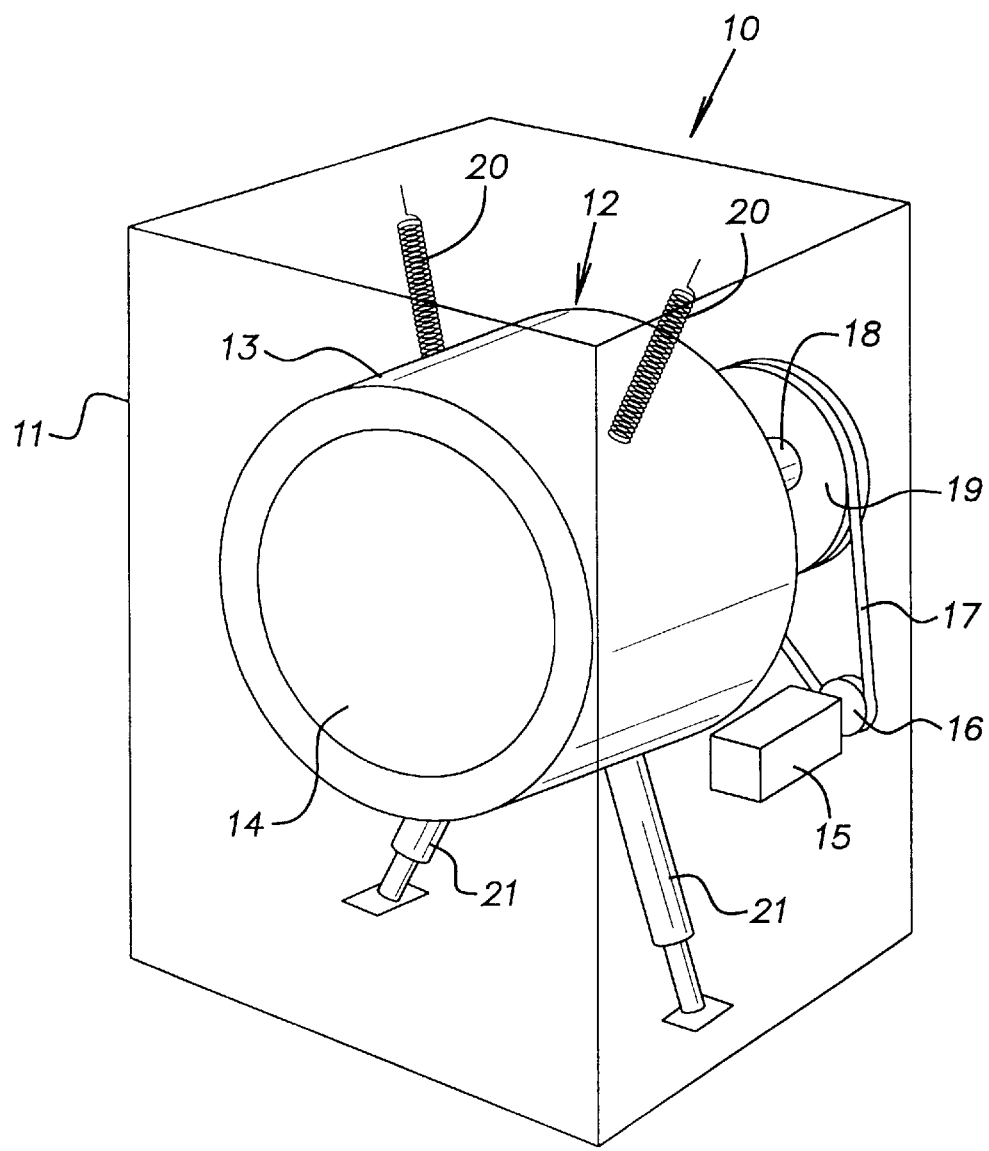
FIG. 1 schematically shows a front-load washing machine in which a balancing arrangement of the invention is used.

FIG. 1 shows schematically a common front-load washing machine 10 provided with a cabinet 11 within which a unit 12 is disposed. The unit comprises a tub 13 in which a washing drum 14 is rotatably mounted to carry the laundry to be treated in the washing machine. Moreover, the unit 12 comprises a driving arrangement for rotating the washing drum, said driving arrangement in the conventional way comprising a driving motor 15 driving the drum via a driving pulley 16, a belt 17 and a pulley 19 mounted on the drum shaft 16.

The unit 12 is mounted in the cabinet 11 such that it can move relatively freely when the washing machine is operating. To this end the unit is suspended in the cabinet 11 by means of springs 20 and vibration dampers 21.

Figure 2:
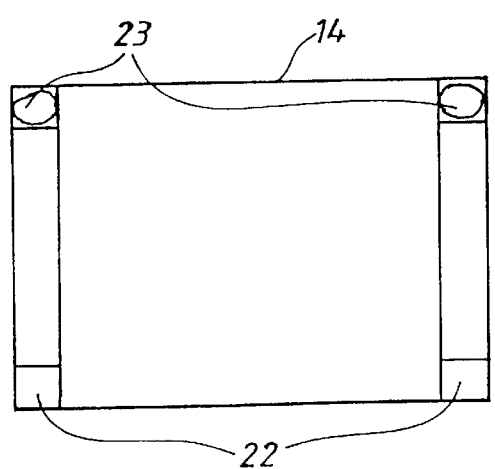
FIG. 2 shows a schematic lateral view of the washing drum in the washing machine of FIG. 1, said drum having paths for balancing bodies provided at both gables.

In order to handle the imbalance forces occurring when the washing drum with the unevenly distributed laundry for dewatering purposes is driven into spin-drying speed the washing drum is provided with a ball balancing arrangement of a kind principally known. The arrangement is schematically shown in FIG. 2 in which the washing drum 14 is provided with closed circular tubular paths 22 which contain balancing bodies 23 which can move freely along the path. The paths are disposed at the lateral gables of the washing drum 14 and are fixedly secured to the drum. At least one path is required but in order to achieve a dynamic balancing of the drum with its laundry load paths are provided at both gables of the drum.

Figure 3:
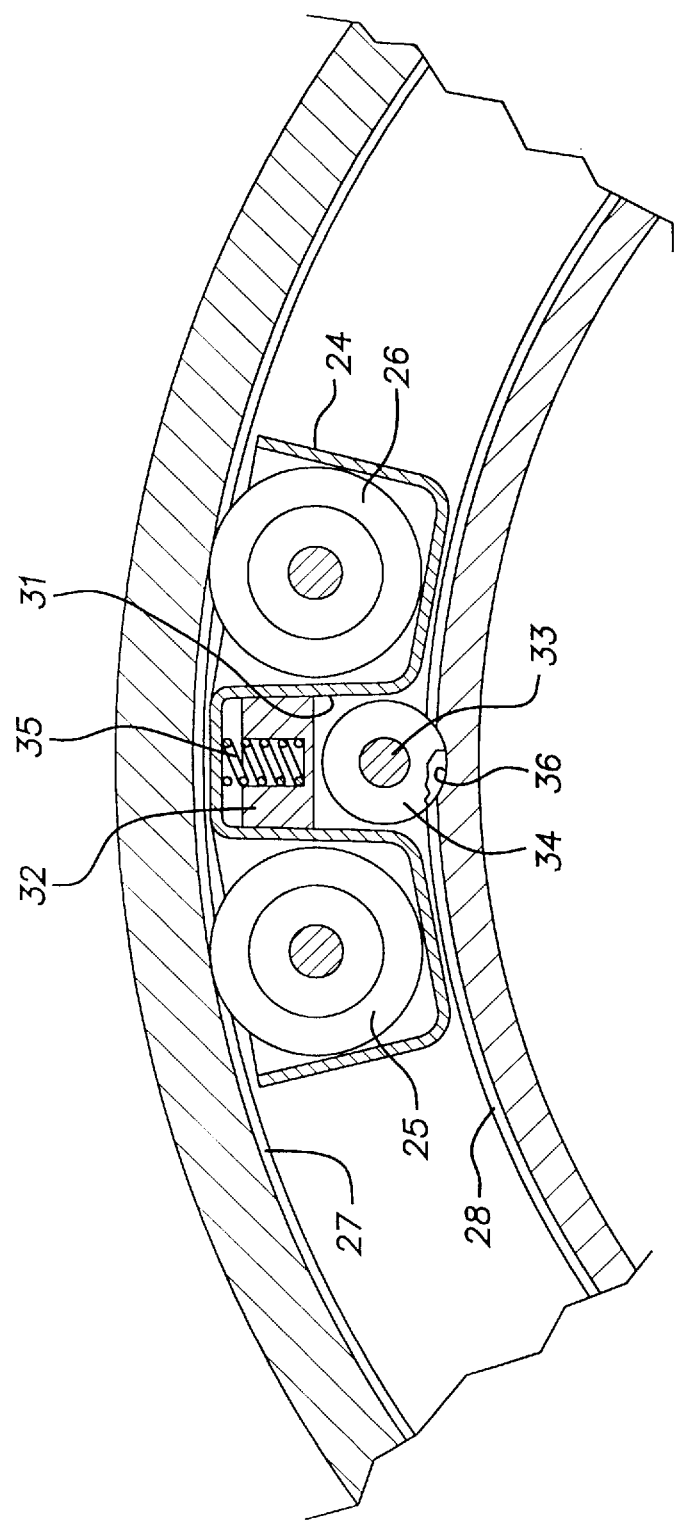
FIG. 3 is a detail view showing a portion of a path with a balancing body and locking device of a first embodiment.

In the washing machines described in the patent documents referred to above the balancing bodies are balls which can take different positions in their respective path for compensating the imbalance of the drum. In an embodiment according to the invention the balancing bodies must be accessible for the purpose of locking same in a locking position when the drum is rotating at a speed below the critical speed and to that end the loose balls have been replaced by carriages 24 (FIG. 3) adapted to represent the desired balancing mass. In the embodiment according to FIG. 3 the carriage 24 is supported by wheels 25,26 rotatably journalled on the carriage. The wheels run on an outer race 27 which together with an inner race 28 and side walls 29,30 (FIG. 5) form the closed path which has a curvature coinciding with that of the drum 14. The carriage 24 has a tubular chamber 31 in which a piston element 32 is slidably contained. The piston element has a neck 33 for a roller 34 cooperating with the inner race 28. A spring 35 is interposed between the bottom of the tubular chamber and the piston element 32 pressing the latter and hence the roller 34 against the inner race 28. In the position of the carriage 24 shown the roller 34 engages with a recess 36 formed in the inner race 28 and defining the locking position for the carriage when the drum 14 is rotating at speeds below the critical speed.

Figure 4:
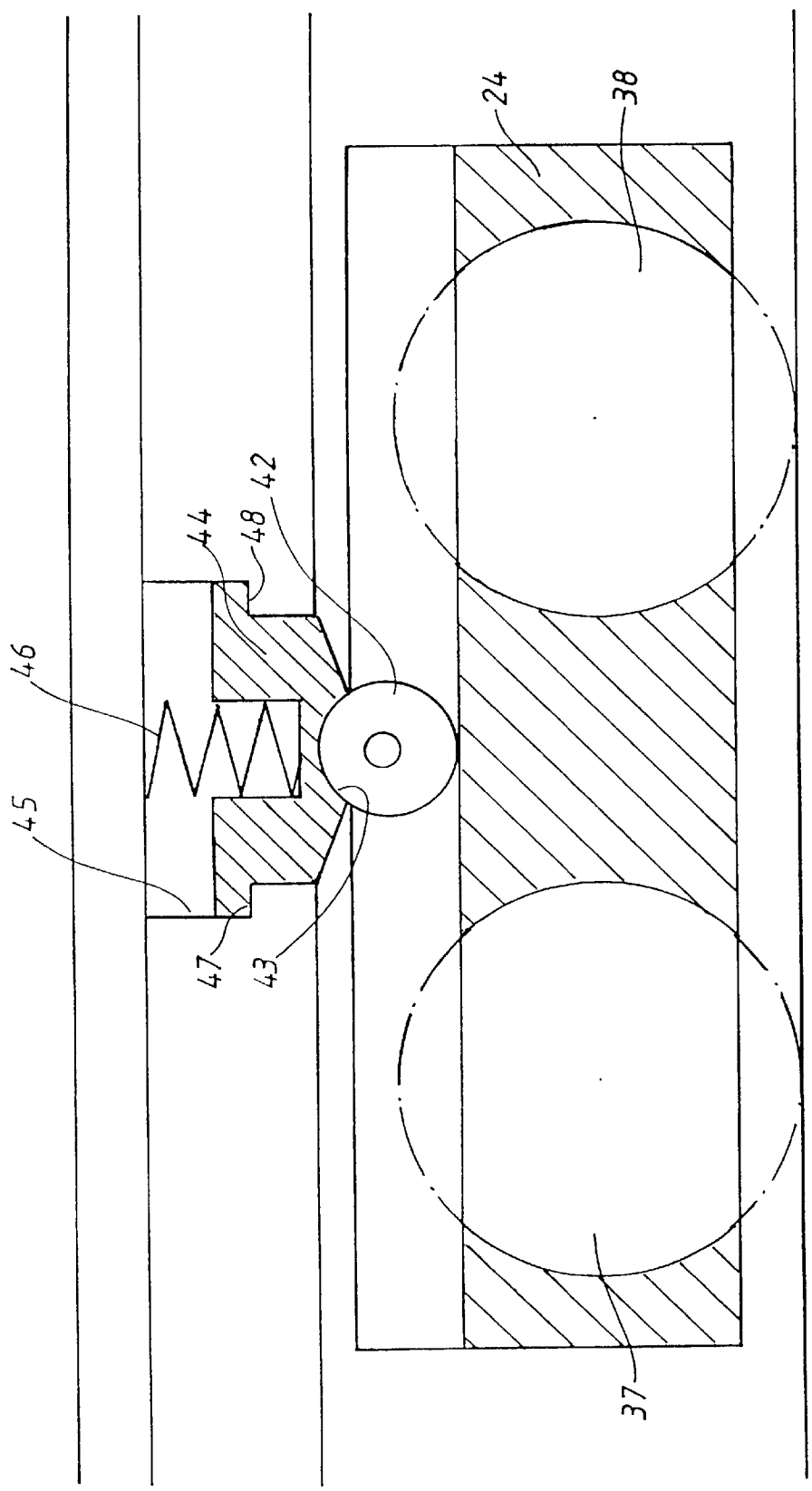
FIG. 4 is a detail view showing a portion of a path with a balancing body and locking device of a second embodiment.
Figure 5:
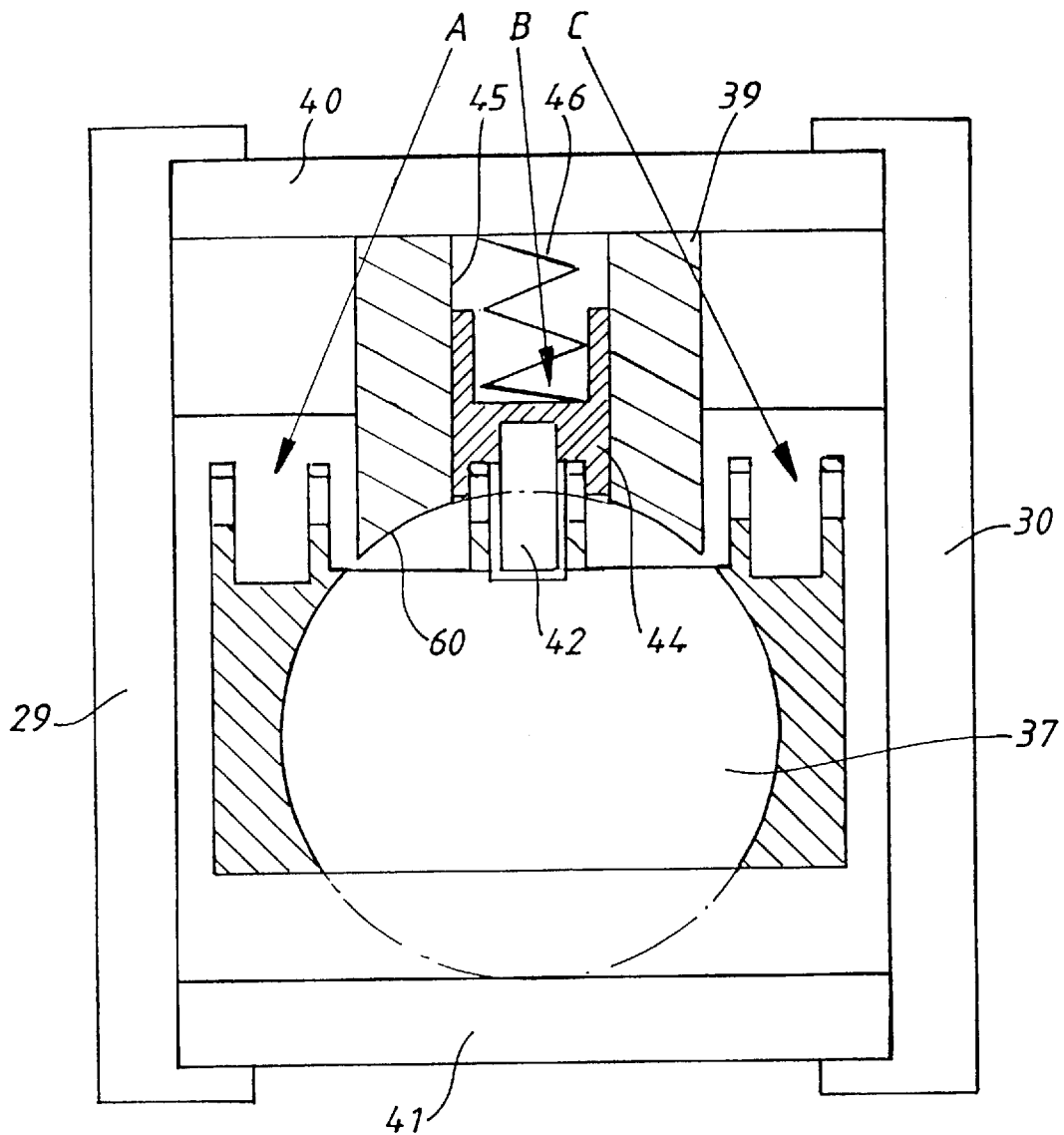
FIG. 5 is a detail view along the length direction of the path showing the balancing body of FIG. 4 and alternative positions for a locking device thereof.

In FIG. 4 an alternative embodiment is shown in which the carriage 24 is supported by balls 37,38 disposed in correspondingly shaped recesses in the carriage like in holders for bearing balls. In this embodiment the balls are adapted to cooperate with the inner race 28 as well as with the outer race which in this case consists of a bent surface 60 on a rail 39 pointed downwards (FIG. 5). As seen in FIG. 5 the tubular path is formed by the side walls 29,30, an upper wall 40 and a lower wall 41. The two walls 40,41 consist of rails bent to annular shape where the lower wall 41 forms the inner race. The rail 39, which forms the outer race 60, extends downwards in the figure from the wall 40 and follows the curvature thereof.

In this embodiment the locking device for the carriage 24 is formed, as before, by a roller 42 which cooperates with a recess 43. In this case, however, the roller 42 is rotatably journalled in the carriage 24 and the recess is formed in a piston element 44 which is displaceably disposed in a chamber 45 of a rectangular cross-section provided in the rail 39 in the desired position. By means of a spring 46 the piston element is pressed downwards against the roller 42. In order for the piston element 44 not to fall out of the cylinder-shaped chamber 45 when the carriage 24 has taken other positions in the path the piston element 44 is provided with a flange 47 cooperating with a locking edge 48 provided in the cylinder-shaped chamber.

In each path there are provided at least two and suitably three carriages. One problem is then how to define the locking positions for the carriages in the respective path. One solution to the problem is to provide at each gable a separate path for each carriage. However, this would require exceptionally large space and a more suitable solution is then to place, at the gables, the carriages in the same path but to provide separate races with recesses for the locking rollers. In the example three carriages are provided in the respective path and FIG. 5 show three different positions A, B and C for positioning of the locking roller. FIG. 6 indicates schematically the positioning of the locking rollers in the three carriages and the corresponding recesses in the actual race. The race is shown in its spread-out condition and the carriages, here designated 24, 24', 24', are in the upper part figure positioned together between two locking positions (recesses) whereas in the lower part figure the carriages are positioned in the respective locking position. Like in FIG. 5 the roller positions on the carriage are designated A, B and C while the corresponding locking positions along the path are designated A', B' and C'. Due to the lateral displacements of the roller positions on the carriage, even if moving in the same path the carriages can cooperate with recesses freely disposed along the periphery of separate races provided for the rollers. In the example where three carriages are provided in the respective path the locking positions or recesses A', B' and C' are disposed evenly interspaced along the periphery of the path.

The balancing arrangement described with reference to FIGS. 1–6 operates in the following way. When a washing cycle in the washing machine is initiated the washing drum 14 is rotated at low speed, about 50 rpm and, if not already taken place at the end of the preceding cycle, when the drum starts rotating the relative movement between the carriages and the drum will cause the carriages to be brought to their respective locking position wherein the roller 34 (FIG. 3) and the roller 42 (FIGS. 4,5), respectively, engage with the corresponding recess 36 (FIG. 3) and 43 (FIG. 4, 5), respectively. Accordingly, when the washing drum 14 rotates at speeds below the critical speed the carriages will be locked in evenly distributed positions and hence the carriages will not change the imbalance situation caused by the laundry.

When a spin drying cycle is to be initiated after the washing and rinsing of the laundry has been completed the drum 14 is accelerated to a selected spin drying speed passing the critical speed of the oscillating system. After the passage the carriages are to be released so that they can take the positions determined by the instantaneously prevailing imbalance situation. The speed at which the locking of the carriages is released is determined by the force generated by the springs 35 and 46, respectively, and is set by suitable dimensioning of the respective spring.

During the spin drying cycle the laundry is dewatered and the imbalance situation changes but the carriages, which are freely moveable at speeds above the critical speed, can immediately adjust in accordance with the changed conditions so that the balanced condition of the washing drum is maintained.

When the spin drying cycle has been completed the washing drum 14 is retarded and on its way to standstill it will again pass the critical speed. During the retardation a condition will develop in which relative movement occurs between the drum and the carriages and some noise will be created when the carriages collide with one another before they have reached and being secured in their respective locking positions. In order to obtain a calmer retardation cycle and reduce the sound level to a minimum the paths have been filled with a highly viscous fluid, preferably thick oil. Alternatively, a cushion made of felt or the like can be provided on the carriages to cooperate with the race in order to cause a light braking effect on the carriage damping the movement of the same. Such a cushion has to be dimensioned for the desired damping effect to be achieved without causing the free movement of the carriages at speeds above the critical speed to be materially restrained.

Figure 7:
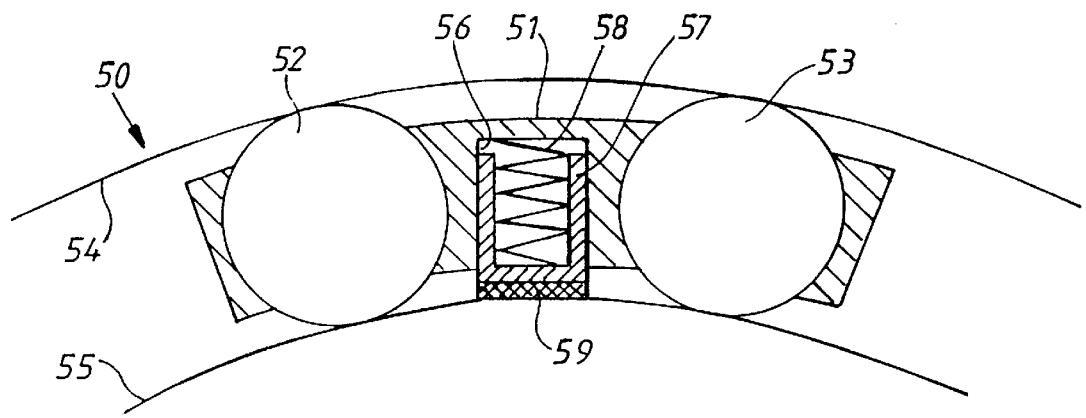
FIG. 7 is a detail view of a path with a balancing body in the form of a carriage of a design in which the balancing body is locked in the position taken during the balancing cycle.

In FIG. 7 a balancing arrangement is shown which is intended to be applied in the balancing of a wheel for a vehicle and the like. In this case the imbalance situation is not changed all the time as in a washing machine and after a balancing cycle one can assume that the balancing achieved can prevail until the wheel has got worn or other circumstances occur that call for a rebalancing.

As in the example described above the balancing arrangement comprises a closed path 50 with a plurality of carriages 51 each supported by balls 52, 53 cooperating with an outer race 54 and an inner race 55 in the path. Also in this case a chamber 56 is created in the carriage 51 in which a piston element 57 is displaceably disposed. The piston element 57 is pressed against the inner race 55 by a spring 58. At its end facing the race 55 the piston element is provided with a friction element 59 which by engagement with the race 55 prevents relative movement between the carriage and the race at speeds below the critical speed. Hence, the balancing set will not change at low speeds but only when needed when the wheel is rotated at speeds above the critical speed. In this case the speed at which the carriages are released is suitably located relatively high up in the speed range so that the carriages are locked at the resonance peaks situated in the range corresponding to a vehicle speed of 50–80 km/h.

I claim:

1. Arrangement for balancing of a main mass (14) having an imbalance and rotating about an axis (18), said balancing being made by means of balancing masses (23;24) which are relatively freely moveable with respect to the main mass (14) and disposed in at least one closed path (22) symmetrically positioned around said axis (18), said main mass (14) being adapted to be rotated at speeds both below and above a critical speed and the path (22) being connected with the main mass (14) so as to rotate in synchronism therewith, locking means (34,36;42,43) being provided for locking the balancing masses (23;24) relative to the path (22) at rotating speeds below the critical speed and for releasing the balancing masses (23;24) for movement relative to the path (22) at rotating speeds above the critical speed, wherein the locking means (34,36;42,43) are operable to cause the balancing masses (23;24) to automatically take a locking position (A', B', C') provided for each balancing mass (23;24) when the main mass (14) is rotated at speeds below the critical speed, said locking positions (A', B', C') being evenly interspaced along the periphery of the path (22).

2. Arrangement according to claim 1, wherein the path (22) comprises an outer and an inner race (27,28;60,41;54, 55) and the balancing masses comprise at least two carriages (24) or the like, each provided with at least two roller bodies (25,26;37,38;52,53) in the form of rollers, balls or the like (25,26) journalled on the carriage and cooperating with the outer race (27), wherein a rotatably journalled roller (34), ball or the like is provided on the carriage and spring-biased against the inner race (28) to cooperate with a corresponding recess (36) in the race thereby locking the carriage (24) relative to the race (28) at speeds below the critical speed.

3. Arrangement according to claim 2, wherein each carriage (24) is disposed in a separate path.

4. Arrangement according to claim 3, wherein the inner race (28) defines a plurality of separate races and each spring-biased roller (34;42) cooperates with one of said plurality of separate races.

5. Arrangement according to claim 2, wherein the roller bodies are balls (37,38) rotatably journalled on the carriage (24) and adapted to cooperate with both the inner and the outer race (41;60), a locking member (42) being provided in either of the races (41;60), spring means (46) or the like being provided to bring said locking member (42) to a position wherein said locking means projects inwardly from the race to lock the carriage at speeds below the critical speed.

6. Arrangement according to claim 5, wherein the race (41;60), in the locking positions, has a chamber (45) in which a piston element (44) is displaceably mounted, spring means (46) or the like being provided to bias the piston element against the carriage (24), the piston element (44) having an end surface adapted to the rounded shape of a roller (42), a ball or the like rotatably journalled on the carriage (24).

7. Arrangement according to claim 6, wherein three carriages are provided in the path and each carriage (24) has three journalling positions (A,B,C) adapted to receive rotatable rollers (42), balls or the like which cooperate with a corresponding piston element (44), the journalling positions (A,B,C) being laterally displaced with respect to one another on the carriage (24) and the locking positions (A', B',C') correspondingly mutually displaced.

8. Arrangement according to any of claims 1–7, wherein the main mass is a washing machine drum (14) loaded with laundry and rotating about a horizontal axis, closed paths (22) for the balancing masses being provided at both gables of the washing drum (14).

9. Arrangement according to any of claims 3–7, wherein three carriages (24;51) are provided in each path (22;50).

10. Arrangement according to any of claims 1–7, wherein the paths (22;50) are at least partially filled with a highly viscous damping fluid.

11. Arrangement according to any of claims 1–7. wherein a cushion made of felt or the like is provided on the respective carriage (24), said cushion being adapted to cooperate with the path (22) in order to damp to a certain extent the movement of the carriage (24).

* * * * *

UNITED STATES PATENT AND TRADEMARK OFFICE
CERTIFICATE OF CORRECTION

PATENT NO. : 5,813,253
DATED : September 29, 1998
INVENTOR(S) : Uhlin

It is certified that error appears in the above-identified patent and that said Letters Patent is hereby corrected as shown below:

Column 3, Line 4, delete "16" and insert --18--.

Column 4, Line 21, delete "24, 24', 24'" and insert --24, 24', 24"--.

Signed and Sealed this

Twenty-third Day of February, 1999

Attest:

Q. TODD DICKINSON

Attesting Officer

Acting Commissioner of Patents and Trademarks